July 26, 1955 E. D. BARAGER Re. 24,043
DISPOSABLE BIB
Original Filed June 11, 1949
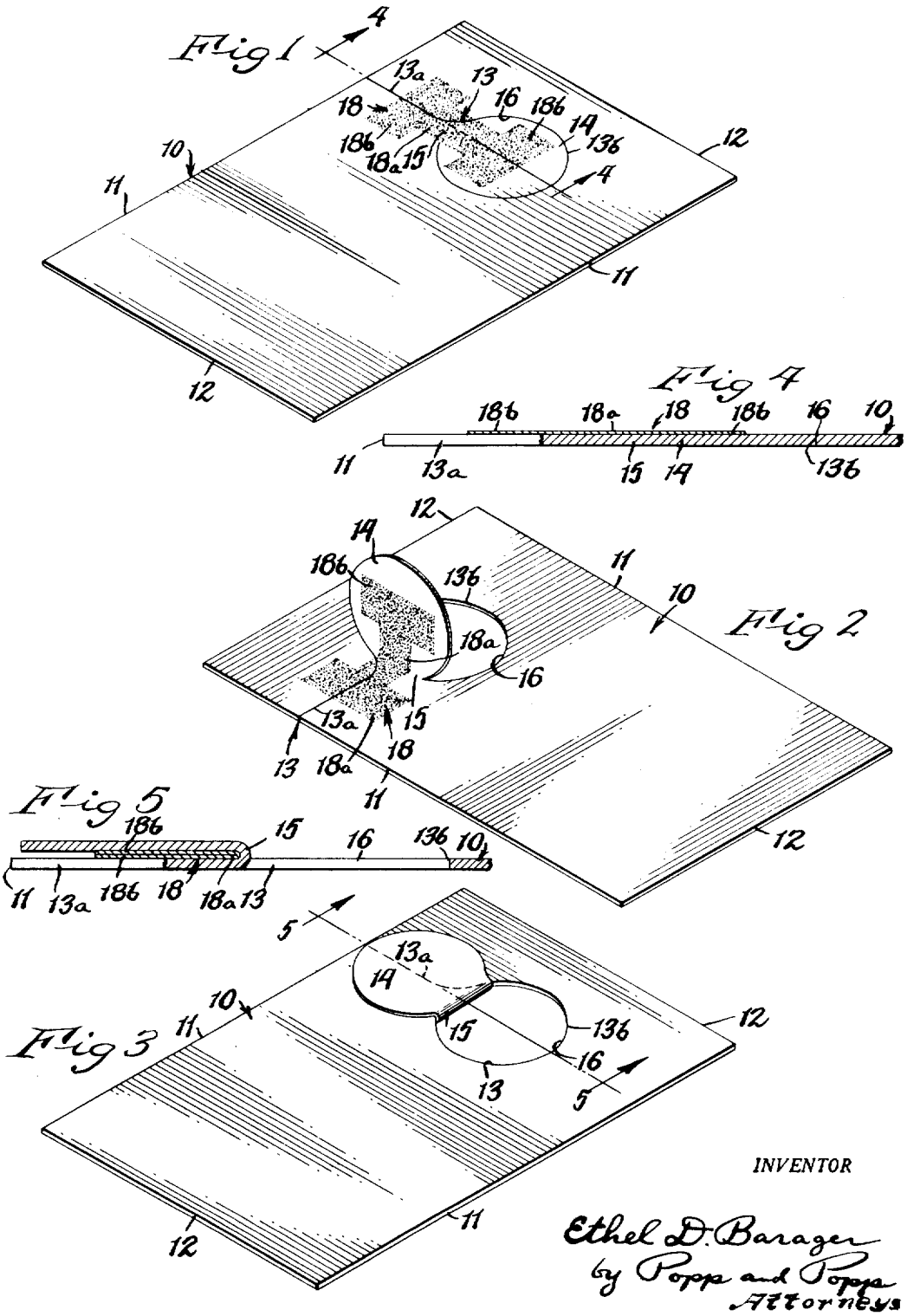
INVENTOR
Ethel D. Barager
by Popp and Popp
Attorneys United States Patent Office Re. 24,043
Reissued July 26, 1955

24,043

DISPOSABLE BIB

Ethel D. Barager, Buffalo, N. Y., assignor of fifty per cent to Clifford M. Carter, Arlington, Va.

Original No. 2,617,104, dated November 11, 1952, Serial No. 98,514, June 11, 1949. Application for reissue August 6, 1953, Serial No. 372,824

4 Claims. (Cl. 2—49)

Matter enclosed in heavy brackets [ ] appears in the original patent but forms no part of this reissue specification; matter printed in italics indicates the additions made by reissue.

This invention relates to a disposable bib made of absorbent paper or the like and which is designed particularly for use by babies and small children and to be thrown away after one use.

One of the principal objects of the invention is to provide a low cost bib of this character which can be quickly and easily applied to a baby or small child and which is not likely to be disarranged or removed by the baby or child and will adequately protect its clothing while eating.

Another object is to provide such a disposable bib which can be made in the form of a rectangular sheet of paper without waste although it will be understood that the bib can be shaped as desired.

Another object is to provide such a disposable bib which is comfortable, neat in appearance and can be readily removed from the baby or child.

Other objects and advantages of the invention will appear from the following description and drawings in which:

Fig. 1 is a perspective view of a bib embodying the invention and as sold to the consumer.

Fig. 2 is a similar view showing the attaching tab folded up.

Fig. 3 is a similar view showing the attaching tab folded flat against the body part of the bib and adhesively secured thereto.

Fig. 4 is an enlarged fragmentary section taken on line 4—4, Fig. 1.

Fig. 5 is an enlarged fragmentary section taken on line 5—5, Fig. 3.

The bib is shown as made from a rectangular body sheet 10 of absorbent paper having longitudinal edges 11 and transverse edges 12, although it will be understood that the bib can be made of any suitable low cost flexible sheet material and can be shaped as desired.

Near one end of the body sheet it is provided with a cut 13 generally in the form of a question mark having a part *or first slit* 13a extending transversely inwardly from one longitudinal edge 11 thereof and shown as being straight and parallel with the transverse edges 12 thereof. This cut 13 is continued at the center of the body sheet in a generally *arcuate configuration* [circular direction], as indicated *by second slit* [at] 13b, to a point short of the *first slit 13a* [cut 13] thereby to provide a generally circular tab 14 *defined by the second slit 13b and* joined to the body part of the sheet adjacent the inwardly extending part *or first slit* 13a of the cut by a narrow neck 15. The tab 14 is foldable along a line extending transversely of the neck 15 to bridge the inwardly extending part *or first slit* 13a of the cut and the [generally circular part] *substantially arcuate configuration of second slit* 13b of the cut is of a diameter to provide an opening 16 fitting the neck of the user.

On one side of the bib an H-shaped layer 18 of adhesive is applied to the body sheet 10, neck 15 and tab

14. This layer of adhesive is preferably of the type which will only adhere to itself so that the bibs can be sold in the form of a stack without danger of the gummed side of one bib sticking to the reverse side of the next bib. The cross bar 18a of the layer of adhesive extends along the neck 15 and the parallel bars 18b arranged, respectively, on the tab 14 and on the body part 10 of the sheet on opposite sides of the inwardly extending part *or first slit* 13a of the cut 13. These parallel bars 18b are arranged to register and be brought into contact with each other when the tab 14 is folded along the neck 15 as shown in Fig. 2 and then folded flat as shown in Fig. 3.

It will be seen that in the use of the bib the tab 14 is first folded to the position shown in Fig. 2. It can then be readily fitted over the neck of the baby, the inwardly extending part *or first slit* 13a of the cut being opened to permit the opening 16 to be brought around the neck of the baby. The tab 14 is then folded flat to bring the parallel bars 18b of the layer 18 of adhesive into engagement with each other. Since the tab 14 and layer 18 of adhesive bridge the inwardly extending part *or first slit* 13a of the cut it will be seen that the tab 14 provides a closed ring around the neck of the baby and prevents removal of the bib except upon being torn away. The soiled bib is torn from the neck of the infant and thrown away.

From the foregoing it will be seen that the present invention provides a very low cost disposable bib which is easily applied and removed and which fully protects the clothing of a baby or small child.

I claim:

*1.* A one piece disposable paper bib, comprising generally rectangular paper sheet substantially longer in one dimension than the other, a slit extending transversely inwardly from one longitudinal edge of said sheet and near one end thereof, said slit continuing at the center of said sheet in a generally circular direction to a point short of said cut to provide a body sheet and a generally circular tab bounded by the internal circular edges of said body sheet and joined to said body sheet by a narrow neck, said neck being foldable to position said tab in bridging relation to the said inwardly extending part of said slit, and an H-shaped layer of adhesive having its cross bar extending along said neck and its parallel bars parallel with said longitudinal edge at and respectively on said tab, and on said body sheet on opposite sides of said inwardly extending part of said slit, and said bars being positioned to register with each other when said neck is so folded to bring said tab in a bridging relation to said inwardly extending part of said slit.

*2. A disposable bib comprising a body sheet, a first slit extending inwardly from one edge of said sheet, a second slit of substantially arcuate configuration constituting a continuation of said first slit and ending short of said first slit to provide a neck opening in said body sheet, a tab defined by said second slit and having a portion thereof disposed on each side of the end of said first slit, a neck portion joining said tab to said body sheet at the end of said second slit, said tab being foldable at said neck portion to position said tab in bridging relation to said first slit, and an adhesive on the portion of the tab disposed on the side of the first slit opposite the side integral with said neck portion, said adhesive adapted to secure said tab to said body sheet in bridging relation to said first slit.*

*3. A disposable bib comprising a body sheet, a first slit extending inwardly from one edge of said sheet, a second slit of substantially arcuate configuration constituting a continuation of said first slit and ending short of said first slit to provide a neck opening in said body sheet, a tab defined by said second slit and having a portion thereof disposed on each side of the end of said*

*first slit, a neck portion joining said tab to said body sheet at the end of said second slit, said tab being foldable at said neck portion to position said tab in bridging relation to said first slit, and a first adhesive on said tab and a second adhesive on said body sheet on the side of said first slit opposite the side integral with said neck portion, said adhesives being substantially equal in area and being positioned to register with each other to secure said tab to said body when said tab is in bridging realtion to said first slit.*

*4. A disposable bib comprising a body sheet, a first slit extending inwardly from one edge of said sheet, a second slit of substantially arcuate configuration constituting a continuation of said first slit and ending short of said first slit to provide a neck opening in said body sheet, a tab defined by said second slit and having a portion thereof disposed on each side of the end of said first slit, a neck portion joining said tab to said body*

*sheet at the end of said second slit, said tab being foldable at said neck portion to position said tab in bridging relation to said first slit, a continuous body of adhesive having one portion lying on each side of said first slit and another portion lying solely on said tab, said adhesive portions being substantially equal in area and being positioned to register with each other to secure said tab to said body when said tab is in bridging relation to said first slit.*

References Cited in the file of this patent or the original patent:

UNITED STATES PATENTS

| | | |
|---|---|---|
| 2,016,079 | Deuel et al. | Oct. 1, 1935 |
| 2,417,787 | Smith | Mar. 18, 1947 |
| 2,425,961 | Shattuck | Aug. 19, 1947 |
| 2,492,599 | Smith | Dec. 27, 1949 |